United States Patent [19]

Zander et al.

[11] Patent Number: 5,737,640
[45] Date of Patent: Apr. 7, 1998

[54] COMBINATION METERING CAM AND FILM TRANSPORT THUMBWHEEL

[75] Inventors: Dennis Roland Zander; John Horace Alligood, both of Penfield; Dwight John Petruchik, Honeoye Falls, all of N.Y.

[73] Assignee: Eastman Kodak Company, Rochester, N.Y.

[21] Appl. No.: 607,739

[22] Filed: Feb. 27, 1996

Related U.S. Application Data

[60] Provisional application No. 60/001,434, Jul. 14, 1995.

[51] Int. Cl.$^6$ .................... G03B 1/10; G03B 17/18
[52] U.S. Cl. .................... 396/6; 396/284; 396/396; 396/411
[58] Field of Search .................... 396/6, 387, 395, 396/396, 401, 411, 281, 284

[56] References Cited

U.S. PATENT DOCUMENTS

| 2,309,382 | 1/1943 | Cazin | 396/396 |
|---|---|---|---|
| 3,868,710 | 2/1975 | Van Osch | 396/394 |
| 5,410,378 | 4/1995 | Tasaka et al. | 396/6 |
| 5,541,690 | 7/1996 | Petruchik | 396/6 |

*Primary Examiner*—Safet Metjahic
*Assistant Examiner*—J. K. Han
*Attorney, Agent, or Firm*—Peter J. Bilinski

[57] ABSTRACT

A film drive gear has a thumbwheel that is rotated by a camera user and also has a shutter cam surface that rotates with the thumbwheel to reset a shutter mechanism and has a film metering cam surface that rotates with the thumbwheel to release a film metering mechanism. The shutter cam surface and the film metering cam surface are axially separated along a shaft of the film drive gear that extends outwardly from the thumbwheel. The drive gear can include a toothed sprocket that actuates a film transport mechanism such that revolution of the thumbwheel rotates the toothed sprocket and moves the photographic film a predetermined distance. The thumbwheel also can be provided with an outer circumferential surface that is coupled to an exposure counter wheel having frame index numbers such that a predetermined number of revolutions of the thumbwheel moves the exposure counter wheel by one frame index number relative to the thumbwheel.

73 Claims, 8 Drawing Sheets

COMBINATION METERING CAM AND FILM TRANSPORT THUMBWHEEL

CROSS REFERENCE TO RELATED APPLICATION

Reference is made to and priority claimed for U.S. Provisional application Ser. No. U.S. 60/001,434, filed 14 Jul. 1995, entitled COMBINATION METERING CAM AND FILM TRANSPORT THUMBWHEEL.

Reference is made to commonly assigned, copending U.S. patent application Ser. No. 08/345,157, entitled "Half-Frame Film Metering", filed Nov. 28, 1994, in the name of Dwight J. Petruchik.

BACKGROUND OF THE INVENTION

1. Field of the Invention

This invention relates generally to photographic cameras and, more particularly, to film transport mechanisms in cameras.

2. Description of the Related Art

A photographic camera contains a length of photographic film and picture-taking components such as a viewfinder, an objective lens, a shutter mechanism, and a film transport mechanism. The photographic film is generally a roll strip of film on which images are produced one frame at a time as the film is wound from a supply spool to a take-up spool. When the shutter mechanism is opened temporarily, light from a photographic scene is permitted to pass through the objective lens and strike the film at an exposure gate, producing an exposed frame. The film transport mechanism then moves the roll strip of film in the camera so that a fresh frame of the film is in position at the exposure gate for the next exposure.

Once per frame exposure, the shutter mechanism must be cocked, or reset. It is important for the film to be moved in the camera by a precisely determined frame spacing for each different exposure to prevent irregularly spaced images, obtain the prescribed number of frames from the roll, and avoid film waste. The control of film movement in a camera to ensure correct frame-to-frame spacing between exposure images is referred to as film metering.

The film supply spool and take-up spool rotate with film movement, but it is the film movement itself that is typically used to key the shutter mechanism resetting and the film metering. For this purpose, generally a sprocket is driven by movement of the roll strip of film such that rotation of the sprocket for an equivalent of one frame is sufficient to reset the shutter mechanism for an exposure and to halt the film movement for film metering. A sprocket that revolves independently of the film supply and take-up spools must be used because the number of revolutions per film frame of both the supply spool and the take-up spool will change from beginning to end as the film roll is exposed. Therefore, neither one of the spools can be used to key the shutter mechanism or to key the film metering. Thus, the film transport mechanism must include the sprocket and an additional gear wain arrangement beyond that which is absolutely necessary to move the film, which adds to camera complexity and cost.

Single-use cameras are popular consumer items in which low production costs, light weight, and small size are of paramount importance. Generally, film in a single-use camera is "prewound" so that a consumer moves film from a first chamber (nominally the take-up chamber) back into a film cartridge as exposures are produced. After a consumer exposes the entire length of film, the consumer provides the camera to a film processor for film development and printing. The film processor winds the last few frames of the film into the cartridge, removes the cartridge, extracts the film, and develops it. The film processor returns the processed film and photographic prints to the consumer and returns the housing and camera components to the manufacturer for refurbishing. The consumer uses the camera only once, hence the term single-use camera. The refurbished camera, with a new load of photographic film, is then sold once again to another consumer.

A design goal for single-use camera film transport mechanisms is to incorporate all film transport components within the camera housing at minimal expense. Typically, a user manually moves the roll of film in the single-use camera from an exposed frame to a fresh frame by turning a thumbwheel that protrudes from the camera housing. A manual film advance mechanism reduces the cost of production and of refurbishing a single-use camera as compared with self-powered mechanisms. Nevertheless, as described above, a gear transfer arrangement having a film-driven sprocket is generally included for the shutter resetting and film metering functions. The sprocket typically includes a cam structure that is used to key the shutter mechanism and film metering. Some cost savings can be achieved by providing a simplified single-use film transport mechanism that only moves the film roll in one direction. It is only necessary to move the film in one direction because a consumer does not have to rewind the film for removal of the film cartridge from the single-use camera, as the film is prewound and film removal is performed by a film processor.

From the discussion above, it should be apparent that there is a need for a film transport mechanism that provides a simplified construction that can be produced at relatively low cost, size, and weight and can perform the functions of shutter resetting and film metering. The present invention fulfills this need.

SUMMARY OF THE INVENTION

The present invention provides a film drive gear having a thumbwheel that actuates the film transport mechanism of a camera and thereby moves photographic film in the camera when rotated by a camera user, the film drive gear further having a shutter cam surface that rotates with the thumbwheel and moves a shutter reset lever of the photographic camera to reset a shutter mechanism and a film metering cam surface that rotates with the thumbwheel and moves a metering lever of the photographic camera to release a film metering mechanism. In this way, a film transport mechanism that includes the film drive gear can be provided with a simplified construction that can be produced at relatively low cost, size, and weight and can perform the functions of shutter resetting and film metering.

In one aspect of the invention, the shutter cam surface and the film metering cam surface are axially separated along a shaft of the film drive gear that extends outwardly from the thumbwheel. The film drive gear can advantageously be provided with a toothed sprocket that actuates the film transport mechanism and with cam surfaces such that one revolution of the thumbwheel rotates the toothed sprocket one revolution and moves the photographic film a distance of one frame. Alternatively, the cam surfaces and toothed sprocket can actuate the film transport mechanism such that some other predetermined number of thumbwheel revolutions will advance the film, such as one-half thumbwheel revolution per frame advance.

In another aspect of the invention, the thumbwheel is provided with an outer circumferential surface that is coupled to an exposure counter wheel having frame index numbers such that one revolution of the thumbwheel moves the exposure counter wheel by one frame index number relative to the thumbwheel. This permits efficient construction of a frame counter that is directly coupled to the thumbwheel.

In yet another aspect of the invention, the film drive sprocket of the thumbwheel cooperates with a support surface to hold the film roll in engagement with the sprocket and permit the sprocket to move the film roll in either direction, in accordance with the sprocket direction of rotation. Such a dual-direction drive advantageously permits the thumbwheel to be rotated and the film moved forward or backward for easier loading and unloading of the film.

Other features and advantages of the present invention should be apparent from the following description of the preferred embodiments, which illustrate, by way of example, the principles of the invention.

DESCRIPTION OF THE PREFERRED EMBODIMENTS

Figure 1:
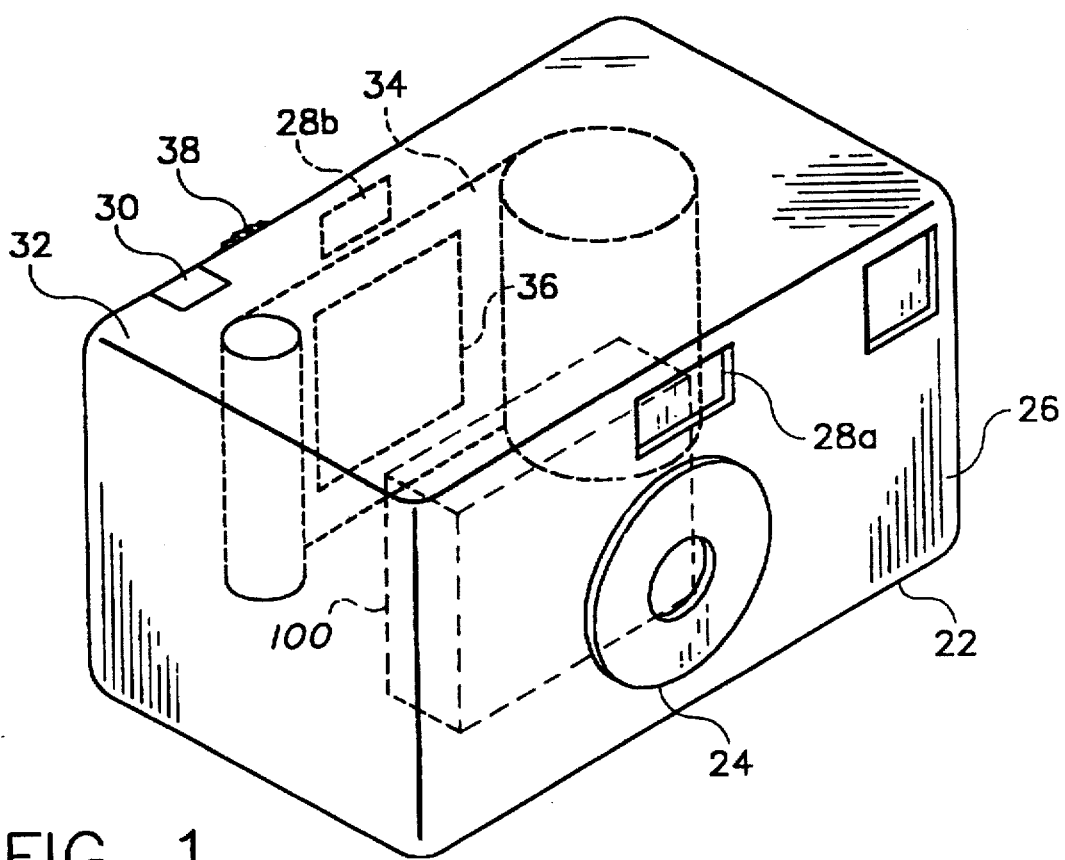
FIG. 1 is an isometric view of a photographic camera constructed in accordance with the present invention.
Figure 2:
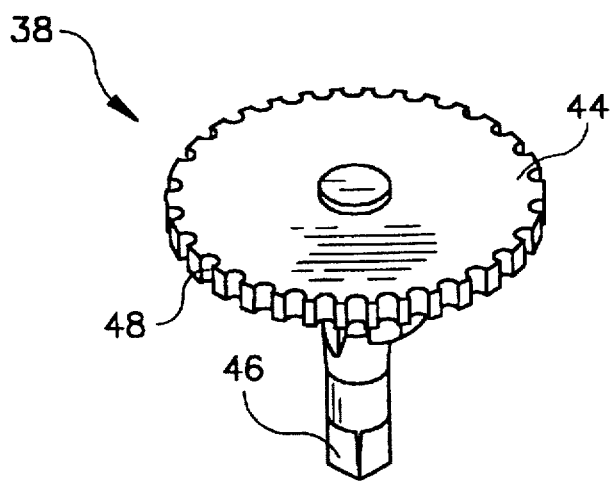
FIG. 2 is an isometric view of the film transport thumbwheel of the camera illustrated in FIG. 1.

FIG. 1 shows a prepackaged single-use camera 20 having a film transport mechanism constructed in accordance with the present invention. The camera includes a sealed outer housing/body 22, an objective lens 24 at a front surface 26 of the camera body, a viewfinder 28, and a shutter release 30 located on a top surface 32 of the camera body. A camera user views a photographic scene through front 28a and rear 28b windows of the viewfinder and exposes one frame of photographic film by pressing the shutter button 30. A roll of photographic film 34 is shown in phantom to illustrate the relative location of the film within the sealed camera body 22. When the shutter release 30 is pressed, a shutter mechanism opens momentarily and directs light from the objective lens 24 onto the film 34 at an exposure gate 36. A film drive gear 38 partially protrudes outside the back of the camera body 22. After a frame is exposed, the film drive gear 38 is rotated to move the film and reset the shutter mechanism. In accordance with a first preferred embodiment of the invention, a single revolution of the film drive gear automatically drives the film forward one frame, performs film metering, and resets the shutter mechanism. FIG. 2 is an isometric view of the film drive gear 38 and FIGS. 3 and 4 are side views showing a shutter cam surface 40 and a film metering cam surface 42 that permit the gear to perform these functions without a complicated gear transfer arrangement, bulky drive train, or other costly mechanism.

Figure 3:
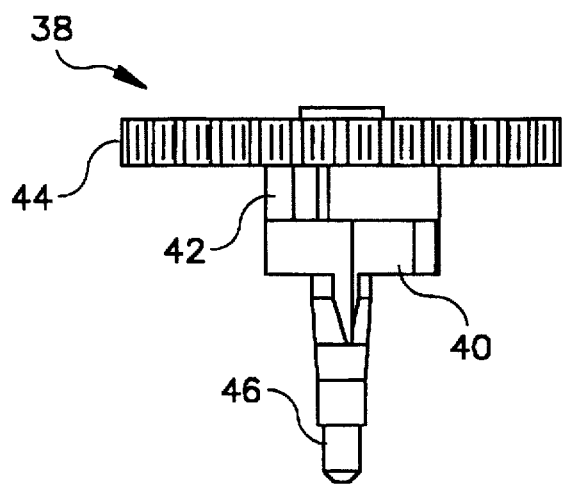
FIG. 3 and FIG. 4 are side views of the film transport thumbwheel illustrated in FIG. 2 showing the thumbwheel cam surfaces.
Figure 4:
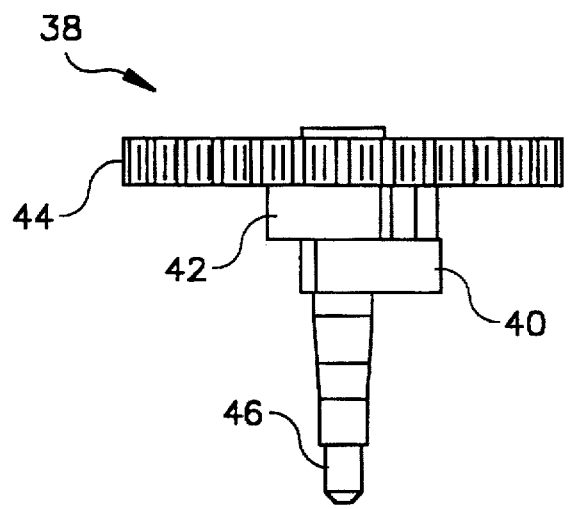

FIGS. 2, 3, and 4 show that the film drive gear 38 includes a toothed thumbwheel head 44 and a shaft 46 that extends outwardly from the thumbwheel head. The shutter cam surface 40 and film metering cam surface 42 are axially separated from the thumbwheel head 44 and from each other along the shaft 46. Thumbwheel gear teeth 48 provided along the outer circumference of the thumbwheel head portion 44 facilitate rotation of the film drive gear 38 by a camera user. As described more particularly below, a single revolution of the film drive gear 38 causes the cam surfaces 40, 42 to interact with camera structures that reset the shutter mechanism and ensure proper metering of the photographic film 34.

Figure 5:
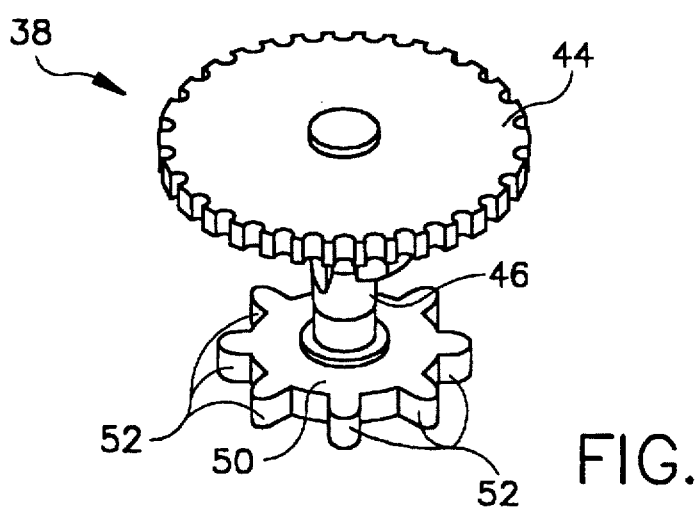
FIG. 5 is an isometric view of the film transport thumbwheel and film drive sprocket of the camera illustrated in FIG. 1.
Figure 6:
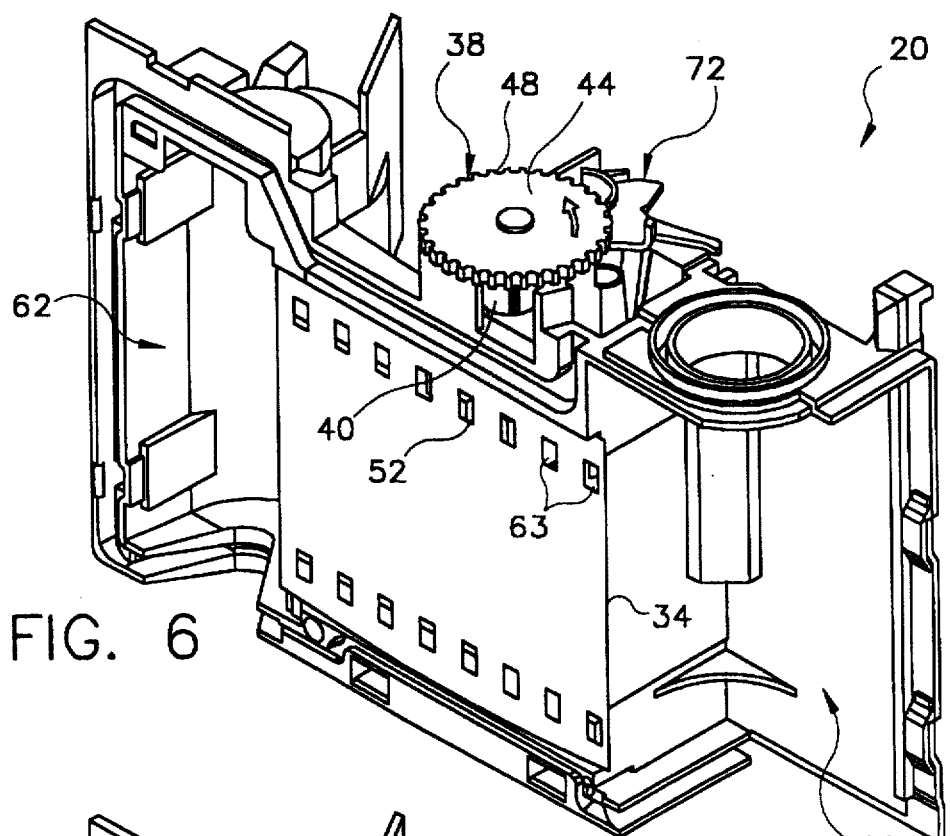
FIG. 6 is an isometric view of the camera illustrated in FIG. 1 with the camera housing partially removed, along with other components, to show construction details.
Figure 7:
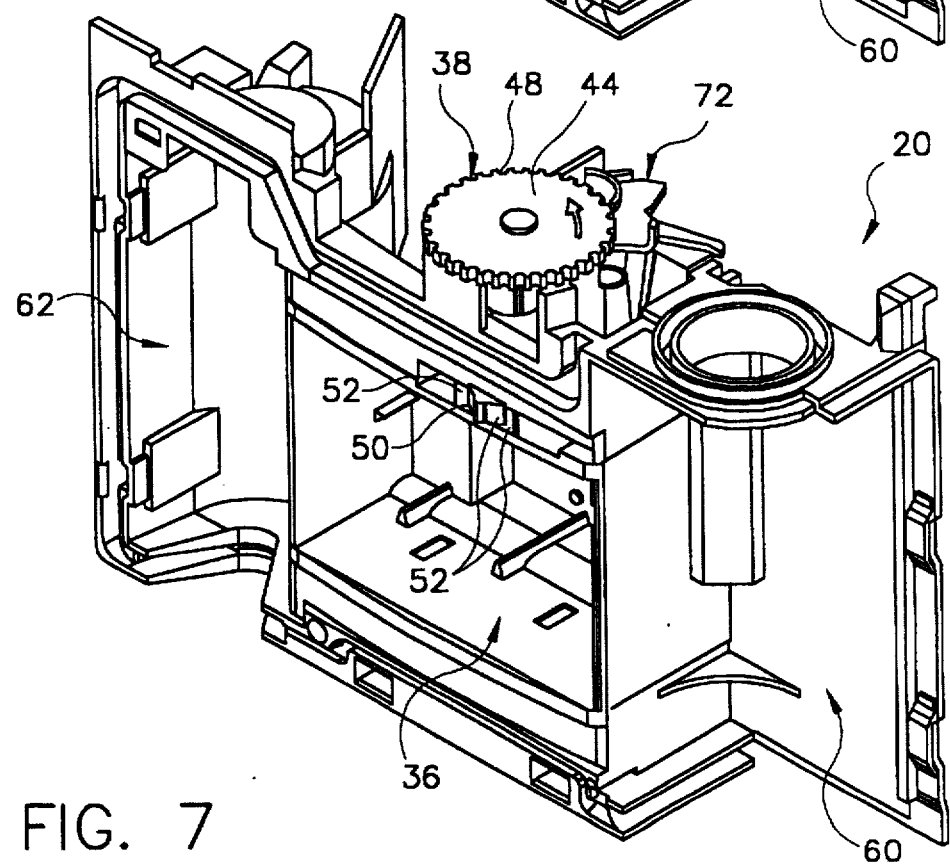
FIG. 7 is a view of the FIG. 6 illustration with the photographic film removed to better show the drive sprocket.

In the preferred embodiment of FIGS. 2–4, the film drive gear 38 advantageously performs the function of driving the film by a direct coupling film transport mechanism that engages the film 34 and moves the film within the camera 20. FIG. 5 shows the thumbwheel head 44 with a film drive sprocket 50 attached to the end of the thumbwheel shaft 46. The film drive sprocket includes drive teeth 52 that engage frame perforations in the photographic film. In the preferred embodiment, the film drive gear 38 is designed to operate with conventional 35 millimeter photographic film, which is typically provided with eight perforations per frame. Therefore, the drive sprocket 50 is provided with eight teeth 52. Thus, one revolution of the thumbwheel head 44 consistently produces movement of the film by one complete frame from the beginning of the film roll to the end of the film roll. The sprocket drive teeth 52 directly engage the film drive perforations of the photographic film. FIG. 6 and FIG. 7 show the camera 20 with a portion of the sealed housing 22 removed to show details of the camera construction. In the single-use camera illustrated for the first preferred embodiment, the roll of photographic film 34 is advanced from a supply chamber 62, where the film is initially coiled, and is driven by rotation of the sprocket 50 into a take-up chamber 60 as exposed frames are produced. Thus, supply and take-up spools can be eliminated from the camera 20 and the film can be permitted to curl on itself in the respective chambers 60, 62. Only a small portion of the film 34 is shown in FIG. 6 and the film is completely removed from the camera 20 in FIG. 7 to better illustrate the chambers 60, 62. Drive perforations 63 of the film 34 are visible in FIG. 6. It should be apparent that a lighttight film canister (not shown) can be employed in either the supply or film roll chambers 60, 62 in a manner commonly known.

Figure 8:
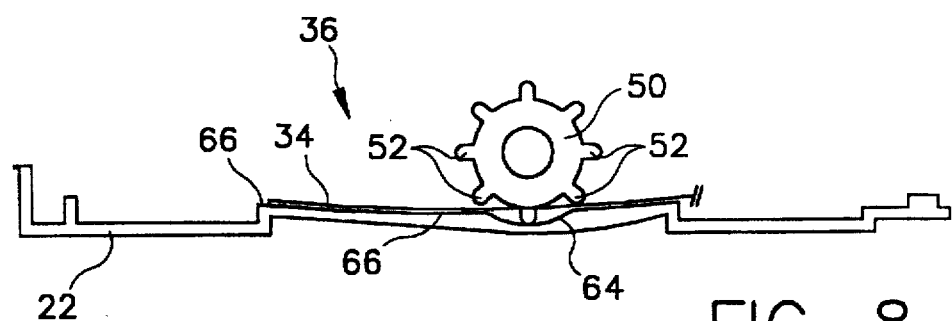
FIG. 8 is a plan view of the camera back and film drive sprocket of the camera illustrated in FIG. 1, FIG. 6, and FIG. 7.

FIG. 8 shows a portion of the camera body 22 relative to the film 34 and the film drive sprocket 50 to illustrate how the film is driven by the sprocket in cooperation with the camera body. In particular, a back panel of the camera body 22 includes a curved indentation 64 that receives the drive teeth 52 of the sprocket 50. The curved indentation is provided in a support surface 66 of the back panel interior surface that otherwise supports the film 34 against the sprocket so that the sprocket teeth 52 engage the drive perforations 63 of the film. In this way, the sprocket drive teeth 52 will cause the film to move forward from the supply chamber 62 to the take-up chamber 60 when the sprocket 50 is rotated by the film drive gear 38.

The curved indentation 64 and support surface 66 together help support the film 34 as the sprocket 50 rotates and advantageously permit the film to be driven into and out of either chamber 60, 62 by changing the direction of rotation of the thumbwheel head 44. That is, the support surface will not permit the film perforations 63 to pop out of engagement with the drive teeth 52 of the sprocket 50 when the thumbwheel rotation is reversed. Thus, easier loading and unloading of film is provided. In addition, if desired, the film transport mechanism shown can be used for cameras capable of re-loading film to permit easier film rewinding by the camera user.

As noted above, rotation of the film drive gear 38 resets the shutter mechanism and meters the film through interaction with the shutter cam surface 40 and film metering cam surface 42, respectively. The shape of these cam surfaces will be better understood with reference to the thumbwheel side views of FIGS. 3 and 4 and also to the plan view of FIG. 9, which shows the thumbwheel head portion 44 in phantom. FIG. 10 shows the thumbwheel cam surfaces in plan view, again with the head portion 44 in phantom, but this time in relation to the photographic film 34 and to a shutter mechanism 70 and film metering mechanism 72.

More particularly, the shutter cam surface 40 has a generally kidney-shaped outline on which a shutter reset lever 74 rides and moves in an arcuate path as the film drive gear 38 is rotated. The cam surface 40 is adapted to ensure that the lever 74 completes a sequence of operational movement once per revolution of the film drive gear such that the shutter mechanism 70 is reset. The film metering cam surface 42 has a generally circular shape that includes a notch 78 into which a metering lever 76 rotates as the film drive gear 38 is rotated clockwise in the drawing. When the lever 76 drops into the notch 78, the film drive gear 38 is locked against further rotation. This occurs once per revolution of the thumbwheel 44 and thereby ensures that film movement is halted after one frame of movement. When the shutter release 30 is actuated, a mechanical linkage (not illustrated) momentarily releases the metering lever 76, once again permitting the thumbwheel to be rotated and the film advanced.

Figure 11:
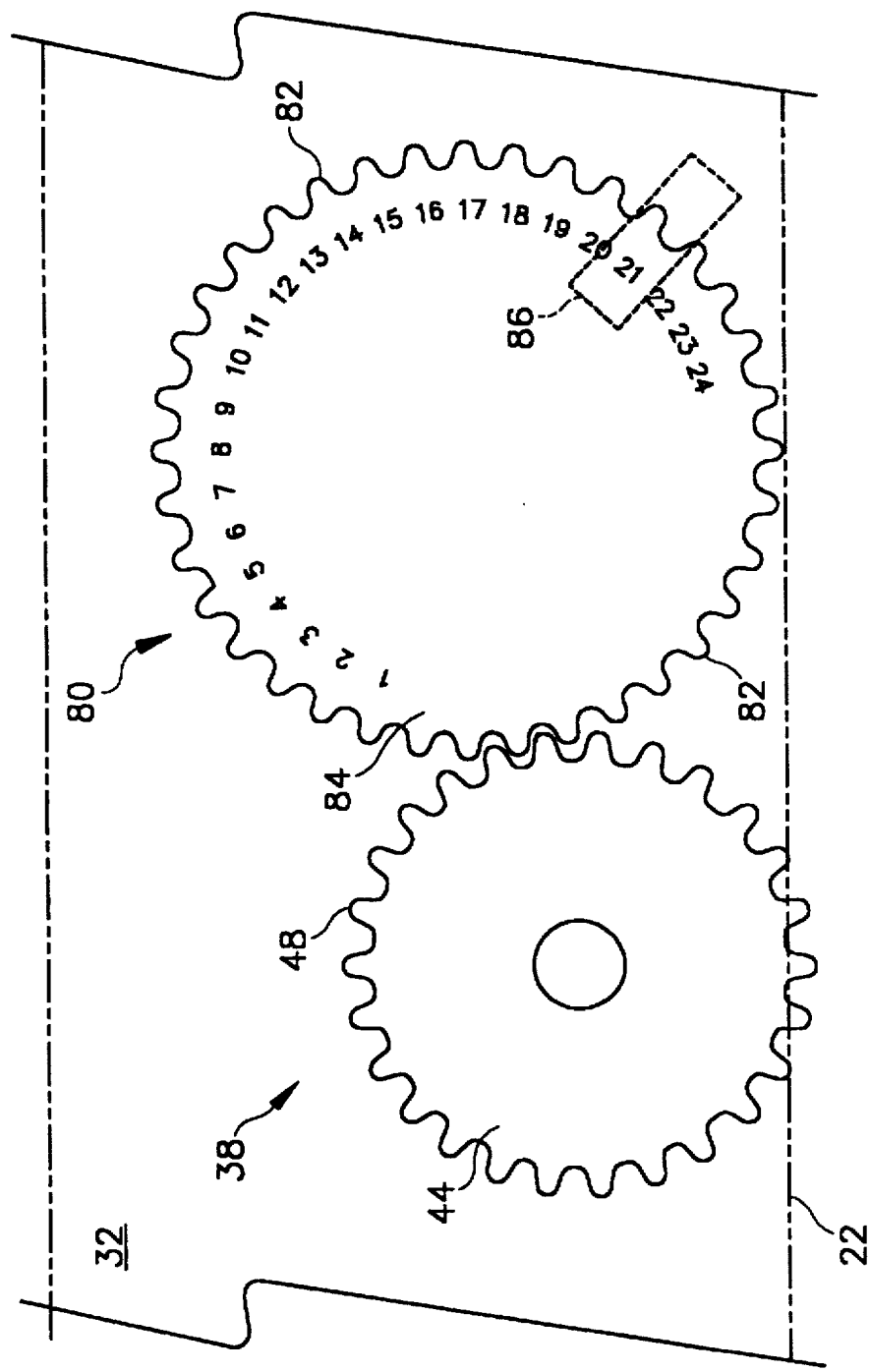
FIG. 11 is a plan view of the thumbwheel coupled to a frame counter wheel of the camera illustrated in FIG. 1.

In the preferred embodiment, the toothed thumbwheel head portion 44 is advantageously used to directly drive an exposure counter wheel. Such an arrangement is illustrated in FIG. 11, which shows the exposure counter structure looking down on the camera top surface 32, which is shown in phantom. An exposure counter wheel 80 is provided with gear teeth 82 that engage the circumferential teeth 48 of the thumbwheel head 44. A top surface 84 of the frame counter wheel 80 includes frame numbers, which are illustrated in FIG. 11 as numbered "1" through "24". One of the frame numbers at a time can be viewed by a camera user through a frame counter window 86 that is cut into the top surface 32 of the camera body 22. In FIG. 11, the counter is shown set at frame number "18" for purposes of illustration.

As will be appreciated by those skilled in the art, the teeth geometry of the respective wheels 44, 80 is selected to advance the frame number that is visible through the counter window 86 with each revolution of the thumbwheel 44. In particular, the thumbwheel is provided with one less gear tooth 48 than the frame counter wheel 80. In the first preferred embodiment, for example, the thumbwheel head 44 has forty-one teeth and the frame counter wheel 80 has forty-two teeth. In this way, with each revolution of the thumbwheel 44, the frame counter wheel will rotate so that it comes to rest at one less tooth than its prior position relative to the thumbwheel. Thus, a different frame count number will appear through the frame counter window 86 once per revolution of the thumbwheel.

The differentially toothed gear wheels 44, 80 and the selected arrangement of the frame numbers permit the frame counter to count up or down. That is, if the thumbwheel head 44 has one less tooth than the frame counter wheel 80, then after one clockwise revolution of the thumbwheel, the frame counter wheel will stop at a frame number that is moved one position counter-clockwise relative to its prior position. If the thumbwheel head 44 has one more tooth than the frame counter wheel, then the frame counter wheel will stop at one position further in the clockwise direction after one revolution of the thumbwheel. Thus, the frame counter will be automatically changed one frame number at a time for each revolution of the thumbwheel.

In the preferred embodiment, the single-use camera 20 contains film that is prewound in the chambers 60, 62. That is, in a single-use camera with a film cartridge, the film is rewound into the cartridge as exposures are produced. Therefore, the frame counter will count down from the maximum number of frames on the film 34 (typically either twelve frames, twenty-four frames, or thirty-six frames) to "3", "2", and "1", and finally to "0" when the film is completely exposed. The frame counter wheel will be repositioned to the maximum number of frames when the single-use camera 20 is processed. Alternatively, if the film transport mechanism is provided in a camera in which the film is loaded and removed by the camera user, the frame counter wheel can be automatically reset when the camera is opened.

In the embodiment described above and illustrated in FIGS. 2–5, the film drive gear 38 is adapted to advance a roll of film 34 by one frame for each revolution of the gear. Alternative combinations of film metering for a predetermined rotation of the film drive gear also are possible. For example, rotation of the film drive gear by only one-half revolution can be used to advance the film and reset the shutter mechanism.

Figure 13:
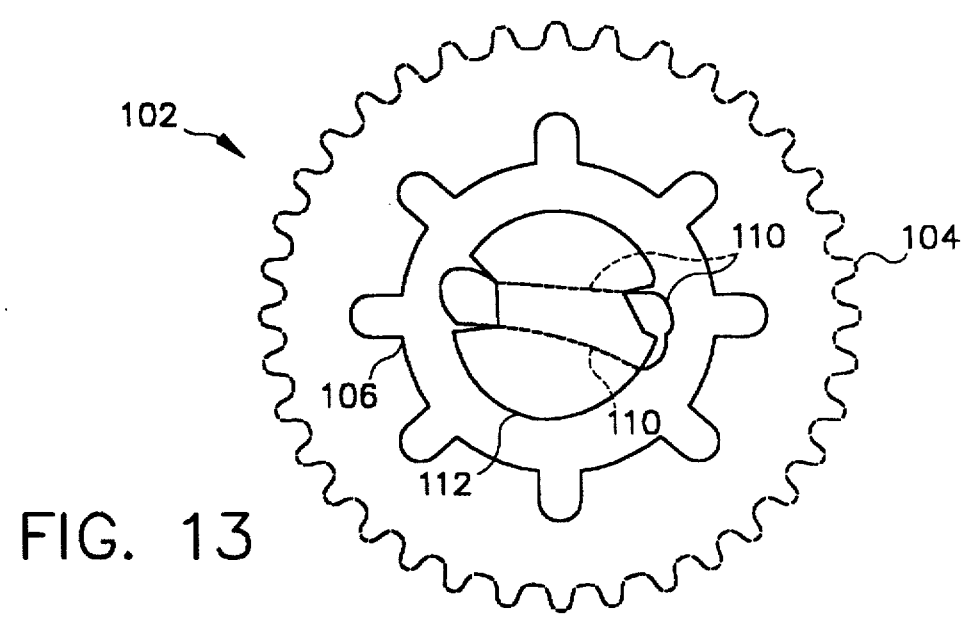
FIG. 13 is a top view of the film drive gear illustrated in FIG. 12.
Figure 12:
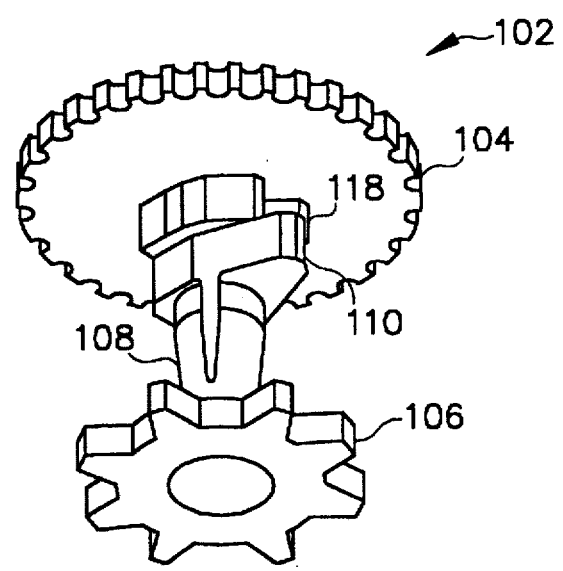
FIG. 12 is an isometric view of an alternate embodiment of the film drive gear illustrated in FIG. 5, in which the cam surfaces reset the film mechanism twice per thumbwheel revolution and advance the film one full frame per thumbwheel revolution.
Figure 14:
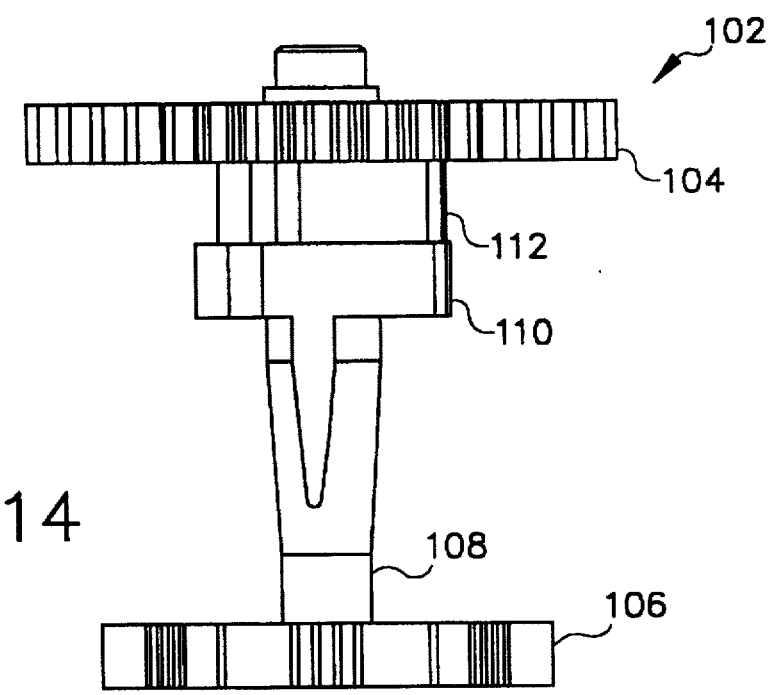
FIG. 14 is a side view of the film drive gear illustrated in FIG. 12.

FIGS. 12, 13, and 14 illustrate an alternative embodiment of a film drive gear constructed in accordance with the invention that includes double cam surfaces and an eight-tooth film drive sprocket that permit resetting of the film drive mechanism with a one-half rotation of the film drive gear. This embodiment is advantageous if, for example, it is desired to expose half-frames on a roll of film, thereby doubling the number of different exposures on the film. FIG. 12 shows that the half-frame film drive gear 102 includes a thumbwheel 104 and an eight-tooth film drive sprocket 106 like the respective thumbwheel and sprocket illustrated in FIGS. 2–5. In FIGS. 12–14, however, the thumbwheel shaft 108 that connects the thumbwheel and film drive sprocket is different from the previous embodiment.

In the embodiment illustrated in FIGS. 12, 13, and 14, the shaft 108 includes a double film metering cam surface 112 and a double shutter cam surface 110. The double cams are also discernible in FIG. 14, which shows a side view of the gear 102, and in FIG. 13, which shows a top view (with the thumbwheel 104 in phantom). FIGS. 12–14 show that the shutter cam surface 110 defines a surface comprising two revolutions of the shutter cam surface 40 illustrated in FIG. 9. Thus, a single revolution of the thumbwheel 104 will reset the shutter mechanism twice. That is, the shutter mechanism will be reset after a one-half rotation of the thumbwheel.

Figure 9:
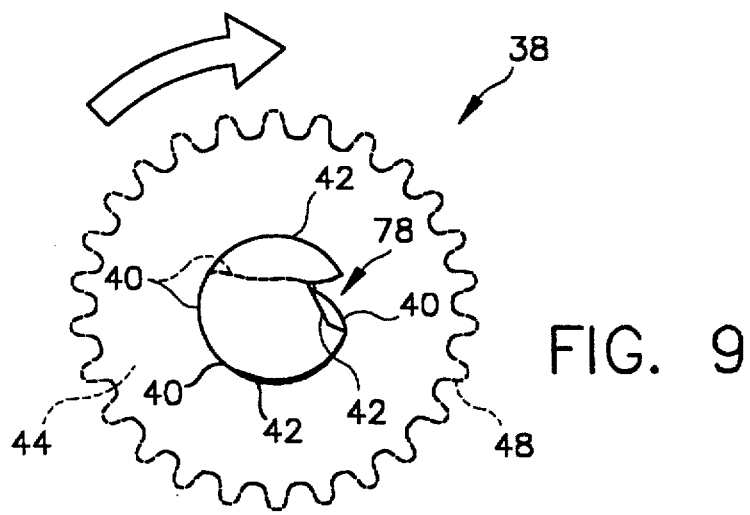
FIG. 9 is a plan view of the thumbwheel of the camera illustrated in FIG. 1 with the thumbwheel outer circumferential surface shown in phantom.
Figure 10:
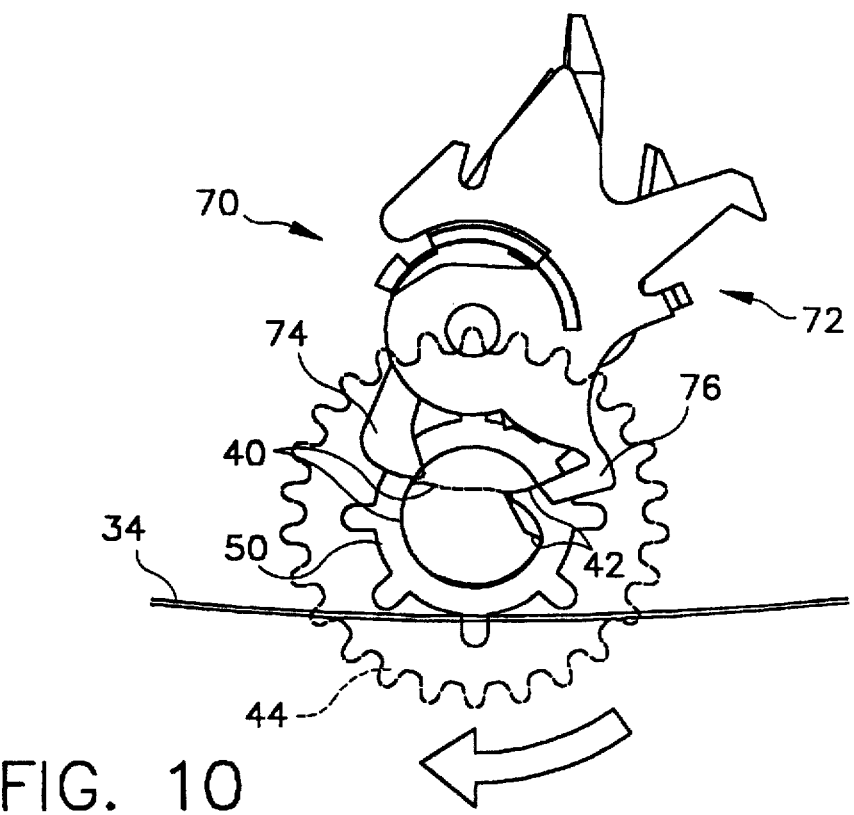
FIG. 10 is a plan view of the camera construction illustrated in FIG. 6 and FIG. 7 showing the interface between the shutter mechanism, film metering mechanism, and thumbwheel cam surfaces.

Similarly, the film metering cam surface 112 can be seen in FIGS. 12–14 to define a surface comprising two revolutions of the film metering cam surface 42 illustrated in FIG. 9. Thus, the film metering mechanism of a camera with the second embodiment of the film drive gear (FIGS. 12–14) will be reset twice per revolution of the thumbwheel 104. That is, after a one-half rotation of the thumbwheel the shutter mechanism will be reset, and the film will be driven one-half frame. Such an arrangement can be advantageous, for example, if the camera exposure mechanisms are arranged to provide two half-frame exposures in the film length otherwise occupied by a single exposure frame.

Figure 15:
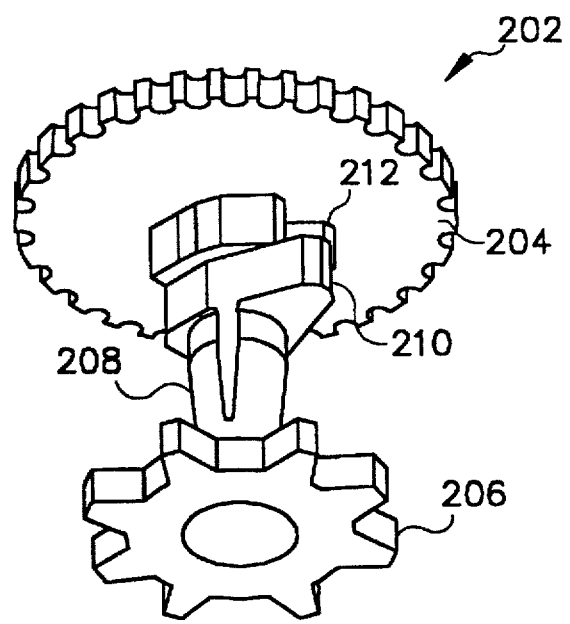
FIG. 15 is an isometric view of an alternate embodiment of the film drive gear illustrated in FIG. 5, in which the cam surfaces reset the film mechanism twice per thumbwheel revolution and advance the film two frames per thumbwheel revolution.
Figure 16:
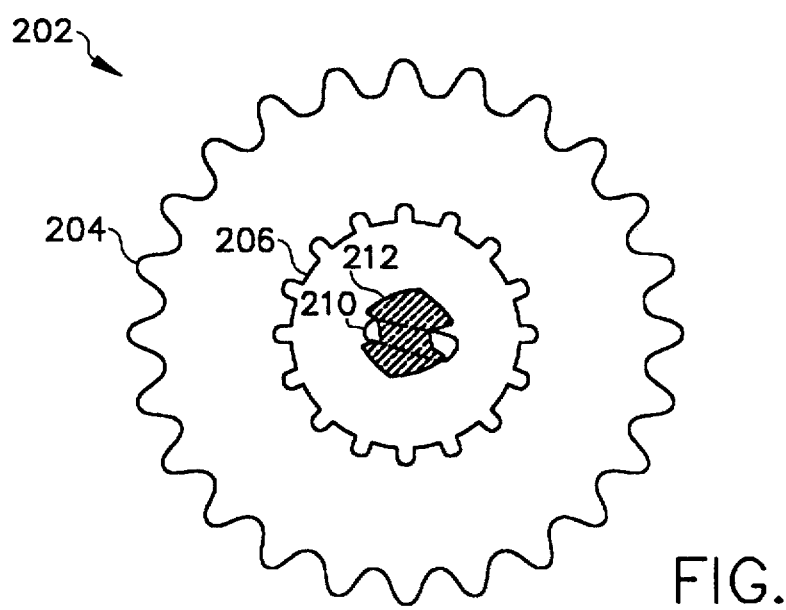
FIG. 16 is a top view of the film drive gear illustrated in FIG. 15.
Figure 17:
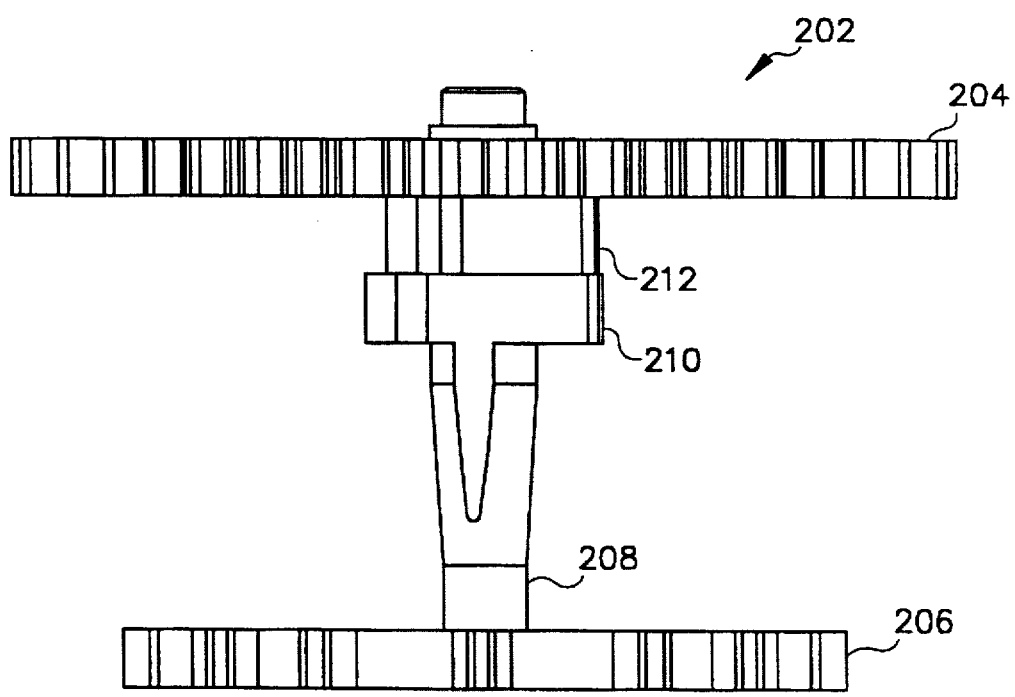
FIG. 17 is a side view of the film drive gear illustrated in FIG. 15.

In another alternative embodiment, a film drive gear constructed in accordance with the present invention can reset the shutter mechanism twice per thumbwheel revolution and can advance the film by two frames per revolution, as well. FIGS. 15, 16, and 17 show such a film drive gear.

The film drive gear 202 illustrated in FIGS. 15, 16, and 17 includes a thumbwheel 204 like those illustrated previously and includes a film drive sprocket 206 connected to the thumbwheel by a shaft 208. In the embodiment illustrated in FIGS. 15–17, however, the film drive sprocket is provided with sixteen teeth and is intended for use with a strip of photographic film having eight perforations per frame. Thus, each rotation of the thumbwheel 204 will advance the photographic film by two frames.

In the embodiment illustrated in FIGS. 15–17, the shutter cam surface 210 defines a surface that resets the shutter mechanism twice per revolution of the thumbwheel and the film metering cam surface 212 defines a surface that advances the film two flames per revolution of the thumbwheel. The film drive gear 202 illustrated in FIGS. 15–17 is a highly efficient gear that will advance the roll of film and reset the film shutter mechanism for single frame photography with just a one-half rotation of the thumbwheel 204. The above concept is more completely described in commonly assigned, copending U.S. patent application Ser. No. 08/345,157, entitled "Half-Frame Film Metering", filed Nov. 28, 1994, in the name of Dwight J. Petruchik.

The film drive gears illustrated above include a thumbwheel that directly drives a roll of photographic film contained in a camera and also actuates a shutter release mechanism and a film metering mechanism by the interaction of respective thumbwheel cam surfaces with respective mechanism levers. The film transport mechanism constructed in accordance with the invention thereby provides a simplified construction that can be produced at relatively low cost, size, and weight. These considerations make the novel film drive gear described above particularly well suited to application and prepackaged, single use cameras. Those skilled in the art will appreciate that the film drive gear is not limited to application in single-use cameras but also can be provided in other camera types, including those that can be reloaded by the user, such as rangefinder cameras, single-lens reflex cameras, and the like. Those skilled in the art will be able to provide the film drive gear of the invention within such other camera types, in view of the description above, without further explanation.

The present invention has been described above in terms of a presently preferred embodiment so that an understanding of the present invention can be conveyed. There are, however, many configurations for film transport mechanisms not specifically described herein, but with which the present invention is applicable. The present invention should therefore not be seen as limited to the particular embodiment described herein, but rather, it should be understood that the present invention has wide applicability with respect to film transport mechanisms generally. All modification, variations, or equivalent arrangements that are within the scope of the attached claims therefore should be considered within the scope of the invention.

The following elements and their corresponding reference numerals are used in the drawings:

camera 20
camera housing/body 22
objective lens 24
front surface 26
viewfinder 28
shutter release 30
top surface 32
photographic film roll 34
exposure gate 36
film drive gear 38
shutter cam surface 40
film metering cam surface 42
toothed thumbwheel head 44
thumbwheel shaft 46
thumbwheel gear teeth 48
film drive sprocket 50
sprocket drive teeth 52
take-up chamber 60
supply chamber 62
drive perforations 63
curved indentation 64
support surface 66
shutter mechanism 70
film metering mechanism 72
shutter reset lever 74
cam surface notch 78
frame exposure counter wheel 80
frame counter gear teeth 82
frame counter top surface 84
frame counter window 86
half-frame film drive gear 102
thumbwheel 104
film drive sprocket 106
thumbwheel shaft 108
shutter cam surface 110
film metering cam surface 112
two-frame film drive gear 202
thumbwheel 204
film drive sprocket 206 shaft 208
shutter cam surface 210
film metering cam surface 212

We claim:

1. A photographic camera film drive gear comprising:
   a thumbwheel having an outer circumferential surface of which a portion projects externally out of the photographic camera for moving photographic film retained in the photographic camera when the thumbwheel is rotated by a camera user;
   a shutter cam surface that rotates with the thumbwheel so that a pivotally mounted shutter reset lever of the photographic camera is moved by the shutter cam surface to reset a shutter mechanism after a predetermined rotation of the thumbwheel; and
   a film metering cam surface that rotates with the thumbwheel so that a pivotally mounted metering lever of the photographic camera is moved by the film metering cam surface to release a film metering mechanism after a predetermined rotation of the thumbwheel, said film drive gear further including a shaft extending from the thumbwheel and upon which the shutter cam surface and film metering cam surfaces are separately disposed to separately and respectively coact with the shutter reset lever and metering lever.

2. A film drive gear as defined in claim 1, further including a toothed sprocket that engages the photographic film such that one revolution of the thumbwheel rotates the toothed sprocket one revolution and moves the photographic film a distance of one frame.

3. A film drive gear as defined in claim 2, further including a shaft that extends vertically from the thumbwheel and on which the toothed sprocket is located.

4. A film drive gear as defined in claim 3, wherein the shutter cam surface, film metering cam surface, and toothed sprocket are aligned on the shaft and are axially separated.

5. A film drive gear as defined in claim 1, wherein the shutter cam surface resets the shutter mechanism once per revolution of the thumbwheel and the film metering cam surface releases the film metering mechanism once per revolution of the thumbwheel.

6. A film drive gear as defined in claim 5, further including a toothed sprocket that engages the photographic film such that one revolution of the thumbwheel rotates the toothed sprocket one revolution and moves the photographic film a distance of one frame.

7. A film drive gear as defined in claim 1, wherein the shutter cam surface resets the shutter mechanism after a one-half rotation of the thumbwheel and the film metering cam surface releases the film metering mechanism after a one-half rotation of the thumbwheel.

8. A film drive gear as defined in claim 7, further including a toothed sprocket that engages the photographic film such that a one-half rotation of the thumbwheel produces a one-half rotation of the toothed sprocket and moves the photographic film a distance of one-half frame.

9. A film drive gear as defined in claim 7, further including a toothed sprocket that engages the photographic film such that a one-half rotation of the thumbwheel produces a one-half rotation of the toothed sprocket and moves the photographic film a distance of one full frame.

10. A film drive gear as defined in claim 1, wherein the thumbwheel outer circumferential surface is coupled to a frame exposure counter wheel having frame index numbers such that one revolution of the thumbwheel moves the frame exposure counter wheel by one frame index number relative to the thumbwheel.

11. A film drive gear as defined in claim 10, wherein the thumbwheel outer circumferential surface is toothed and is in meshing engagement with the frame exposure counter wheel, which also is toothed.

12. A film drive gear as defined in claim 11, wherein the number of teeth on the thumbwheel outer circumferential surface is different from the number of teeth on the frame exposure counter wheel by one tooth.

13. A film drive gear for use in a photographic camera having a camera housing that receives a roll strip of film, an exposure gate in the camera housing that defines a shutter plane across which a length of film is extended, a shutter mechanism including a shutter reset lever pivotally mounted within said housing that is moved to thereby place the shutter mechanism in a set condition, allowing the shutter mechanism to be actuated, a shutter button that can be depressed to actuate the shutter mechanism, and a film metering mechanism that locks to prevent movement of the photographic film and includes a pivotally mounted metering lever that is moved to unlock the film metering mechanism and permit movement of the photographic film, the film drive gear comprising:
   a thumbwheel having an outer circumferential surface of which a portion projects externally out of the camera housing and moves the photographic film;
   a shutter cam surface that rotates with the thumbwheel so that the pivotally mounted shutter reset lever is pivoted by the shutter cam surface to reset the shutter mechanism after a predetermined rotation of the thumbwheel; and
   a film metering cam surface that rotates with the thumbwheel so that the pivotally mounted metering lever is pivoted by the film metering cam surface and unlocks the film metering mechanism after a predetermined rotation of the thumbwheel, said film drive gear further including a shaft that extends outwardly from the thumbwheel and on which the shutter cam surface and the film metering cam surface are separately located.

14. A film drive gear as defined in claim 13, further including a toothed sprocket that actuates the film transport mechanism such that one revolution of the thumbwheel rotates the toothed sprocket one revolution and moves the photographic film a distance of one frame.

15. A film drive gear as defined in claim 14, further including a shaft that extends vertically from the thumbwheel and on which the toothed sprocket is located.

16. A film drive gear as defined in claim 15, wherein the shutter cam surface, film metering cam surface, and toothed sprocket are aligned on the shaft and are axially separated.

17. A film drive gear as defined in claim 13, wherein the shutter cam surface resets the shutter mechanism once per revolution of the thumbwheel and the film metering cam surface releases the film metering mechanism once per revolution of the thumbwheel.

18. A film drive gear as defined in claim 17, further including a toothed sprocket that actuates the film transport mechanism such that one revolution of the thumbwheel rotates the toothed sprocket one revolution and moves the photographic film a distance of one frame.

19. A film drive gear as defined in claim 13, wherein the shutter cam surface resets the shutter mechanism after a one-half rotation of the thumbwheel and the film metering cam surface releases the film metering mechanism after a one-half rotation of the thumbwheel.

20. A film chive gear as defined in claim 19, further including a toothed sprocket that actuates the film transport mechanism such that a one-half rotation of the thumbwheel produces a one-half rotation of the toothed sprocket and moves the photographic film a distance of one-half frame.

21. A film drive gear as defined in claim 19, further including a toothed sprocket that actuates the film transport mechanism such that a one-half rotation of the thumbwheel produces a one-half rotation of the toothed sprocket and moves the photographic film a distance of one full frame.

22. A film drive gear as defined in claim 13, wherein the thumbwheel outer circumferential surface is coupled to a frame exposure counter wheel having frame index numbers such that one revolution of the thumbwheel moves the flame exposure counter wheel by one frame index number relative to the thumbwheel.

23. A film drive gear as defined in claim 22, wherein the thumbwheel outer circumferential surface is toothed and is in meshing engagement with the exposure counter wheel, which also is toothed.

24. A film drive gear as defined in claim 23, wherein the number of teeth on the thumbwheel outer circumferential surface is different from the number of teeth on the exposure counter wheel by one tooth.

25. A film transport mechanism comprising:
an actuatable shutter mechanism including a pivotally mounted shutter reset lever that is pivoted to place the shutter mechanism in a set condition allowing the shutter mechanism to be actuated;
a film metering mechanism that locks to prevent movement of the photographic film and includes a pivotally mounted metering lever that is pivoted to unlock the film metering mechanism and permit movement of the photographic film; and
a film drive gear having a rotatable thumbwheel with an outer circumferential surface of which a portion projects externally out of the photographic camera and is coupled to the photographic film so that the film drive gear moves the photographic film when the thumbwheel is rotated by a camera user, the film drive gear further having a shaft that projects outwardly from the thumbwheel and includes a shutter cam surface that pivots the pivotally mounted shutter reset lever and a film metering cam surface separately disposed on said shaft from said shutter cam surface that separately pivots the metering lever and releases the film metering mechanism when the thumbwheel is rotated.

26. A film transport mechanism as defined in claim 25, wherein the film drive gear further includes a toothed sprocket that engages the photographic film such that one revolution of the thumbwheel rotates the toothed sprocket one revolution and moves the photographic film a distance of one frame.

27. A film transport mechanism as defined in claim 26, wherein the film drive gear further includes a shaft that extends vertically from the thumbwheel and on which the toothed sprocket is located.

28. A film transport mechanism as defined in claim 27, wherein the shutter cam surface, film metering cam surface, and toothed sprocket are aligned on the shaft and axially separated.

29. A film transport mechanism as defined in claim 25, wherein the shutter cam surface resets the shutter mechanism once per revolution of the thumbwheel and the film metering cam surface releases the film metering mechanism once per revolution of the thumbwheel.

30. A film transport mechanism as defined in claim 29, wherein the film drive gear further includes a toothed sprocket that engages the photographic film such that one revolution of the thumbwheel rotates the toothed sprocket one revolution and moves the photographic film a distance of one frame.

31. A film transport mechanism as defined in claim 25, wherein the shutter cam surface resets the shutter mechanism after a one-half rotation of the thumbwheel and the film metering cam surface releases the film metering mechanism after a one-half rotation of the thumbwheel.

32. A film transport mechanism as defined in claim 31, wherein the film drive gear further includes a toothed sprocket that engages the photographic film such that a one-half rotation of the thumbwheel produces a one-half rotation of the toothed sprocket and moves the photographic film a distance of one-half frame.

33. A film transport mechanism as defined in claim 31, wherein the film drive gear further includes a toothed sprocket that engages the photographic film such that a one-half rotation of the thumbwheel produces a one-half rotation of the toothed sprocket and moves the photographic film a distance of one full frame.

34. A photographic combination as defined in claim 33, wherein the thumbwheel outer circumferential surface is coupled to a frame exposure counter wheel having frame index numbers such that one revolution of the thumbwheel moves the frame exposure counter wheel by one frame index number relative to the thumbwheel.

35. A film transport mechanism as defined in claim 25, further including a film support surface that maintains engagement of the photographic film with the toothed sprocket when the thumbwheel direction of rotation is reversed.

36. A film transport mechanism as defined in claim 25, wherein the thumbwheel outer circumferential surface is coupled to a frame exposure counter wheel having frame index numbers such that one revolution of the thumbwheel moves the frame exposure counter wheel by one frame index number relative to the thumbwheel.

37. A film transport mechanism as defined in claim 36, wherein the thumbwheel outer circumferential surface and the frame exposure counter wheel are toothed and are in meshing engagement.

38. A film transport mechanism as defined in claim 37, wherein the number of teeth on the thumbwheel outer circumferential surface is different from the number of teeth on the frame exposure counter wheel by one tooth.

39. A photographic combination as defined in claim 37, further including a film support surface that maintains engagement of the photographic film with the toothed sprocket when the thumbwheel direction of rotation is reversed.

40. A photographic camera comprising:
a camera housing that receives a roll strip of photographic film;
an exposure gate in the camera housing defining a shutter plane across which a length of the photographic film is extended;
an actuatable shutter mechanism including a shutter reset lever pivotally mounted to said housing that is pivoted to place the shutter mechanism in a set condition so the shutter mechanism can be actuated;
a shutter release that is actuated by the camera user and in response actuates the shutter mechanism;
a film metering mechanism that locks and to prevent movement of the photographic film including a separate metering lever pivotally mounted to said housing that moves to unlock the film metering mechanism and permit movement of the photographic film so that a fresh frame of the photographic film can be positioned at the exposure gate;

a rotatable thumbwheel having an outer circumferential surface of which a portion extends externally out of the camera housing allowing a camera user to rotate the thumbwheel, wherein the thumbwheel is coupled to the photographic film to move the photographic film when the thumbwheel is rotated by the camera user;

a shutter cam surface that rotates with the thumbwheel so that the pivotally mounted shutter reset lever is moved by the shutter cam surface and resets the shutter mechanism after a predetermined rotation of the thumbwheel; and a film metering cam surface that rotates with the thumbwheel so that the pivotally mounted metering lever is separately pivoted by the film metering cam surface and releases the film metering mechanism after a predetermined rotation of the thumbwheel, said thumbwheel including a shaft extending outwardly therefrom and upon which the shutter cam surface and film metering cam surfaces are separately disposed.

41. A photographic camera as deemed in claim 40, further including a toothed sprocket that directly engages the photographic film such that one revolution of the thumbwheel rotates the toothed sprocket one revolution and moves the photographic film a distance of one frame.

42. A photographic camera as defined in claim 41, wherein the thumbwheel further includes a shaft that extends outwardly from the thumbwheel, on which the toothed sprocket is located.

43. A photographic camera as defined in claim 42, wherein the shutter cam surface, film metering cam surface, and toothed sprocket are aligned on the shaft and are axially separated.

44. A photographic camera as deemed in claim 43, further including a film support surface that maintains engagement of the photographic film with the toothed sprocket when the thumbwheel direction of rotation is reversed.

45. A photographic camera as defined in claim 40, further including a frame exposure counter wheel having frame index numbers and gear teeth, wherein the thumbwheel outer circumferential surface is coupled to the frame exposure counter wheel gear teeth such that one revolution of the thumbwheel moves the frame exposure counter wheel by one frame index number relative to the thumbwheel.

46. A photographic camera as defined in claim 45, wherein the thumbwheel outer circumferential surface is toothed, and the frame exposure counter wheel is toothed, and are in meshing engagement.

47. A photographic camera as defined in claim 46, wherein the number of teeth on the thumbwheel outer circumferential surface is different the number of teeth on the frame exposure counter wheel by one tooth.

48. A photographic camera as defined in claim 40, wherein the shutter cam surface resets the shutter mechanism once per revolution of the thumbwheel and the film metering cam surface releases the film metering mechanism once per revolution of the thumbwheel.

49. A photographic camera as defined in claim 48, further including a toothed sprocket that engages the photographic film such that one revolution of the thumbwheel rotates the toothed sprocket one revolution and moves the photographic film a distance of one frame.

50. A photographic camera as defined in claim 40, wherein the shutter cam surface resets the shutter mechanism after a one-half rotation of the thumbwheel and the film metering cam surface releases the film metering mechanism after a one-half rotation of the thumbwheel.

51. A photographic camera as defined in claim 50, further including a toothed sprocket that engages the photographic film such that a one-half rotation of the thumbwheel produces a one-half rotation of the toothed sprocket and moves the photographic film a distance of one-half frame.

52. A photographic camera as defined in claim 50, further including a toothed sprocket that engages the photographic film such that a one-half rotation of the thumbwheel produces a one-half rotation of the toothed sprocket and moves the photographic film a distance of one full frame.

53. A photographic combination as defined in claim 40, wherein the thumbwheel outer circumferential surface and the frame exposure counter wheel are toothed and are in meshing engagement.

54. A photographic combination as defined in claim 40, wherein the number of teeth on the thumbwheel outer circumferential surface is different from the number of teeth on the frame exposure counter wheel by one tooth.

55. A prepackaged single-use photographic combination comprising:

a camera housing;

a roll strip of photographic film contained within the camera housing;

an exposure gate in the camera housing defining a shutter plane across which a length of the photographic film is extended;

an objective lens for directing light from a photographic scene to the exposure gate;

an actuatable shutter mechanism including a shutter reset lever pivotally mounted within said housing that is pivoted to place the shutter mechanism in a set condition so the shutter mechanism can be actuated to allow light from the photographic scene to enter said exposure gate through the objective lens;

a shutter release, located on the camera housing, that is actuated by a camera user and in response actuates the shutter mechanism;

a film metering mechanism that locks to prevent movement of the photographic film within the camera housing and includes a separate metering lever pivotally mounted with said housing that pivots to unlock the film metering mechanism and permit movement of the photographic film allowing a fresh frame of the photographic film to be positioned at the exposure gate;

a rotatable thumbwheel having an outer circumferential surface of which a portion projects externally out of the camera housing, wherein the thumbwheel is coupled to the photographic film so that the thumbwheel moves the photographic film when the thumbwheel is rotated by the camera user;

a shutter cam surface that rotates with the thumbwheel so that the pivotally mounted shutter reset lever of the shutter mechanism is pivoted by the shutter cam surface and resets the shutter mechanism after a predetermined rotation of the thumbwheel; and a film metering cam surface that rotates with the thumbwheel so that the pivotally mounted metering lever is pivoted by the film metering cam surface and releases the film metering mechanism after a predetermined rotation of the thumbwheel, wherein the thumbwheel further includes a shaft extending outwardly therefrom and upon which the shutter cam surface and film metering cam surfaces are separately disposed.

56. A photographic combination as defined in claim 55, further including a toothed sprocket that directly engages the photographic film such that one revolution of the thumbwheel rotates the toothed sprocket one revolution and moves the photographic film a distance of one frame.

57. A photographic combination as defined in claim 56, wherein the thumbwheel further includes a shaft that extends outwardly from the thumbwheel and on which the toothed sprocket is located.

58. A photographic combination as defined in claim 57, wherein the shutter cam surface, film metering cam surface, and toothed sprocket are aligned on the shaft and are axially separated.

59. A photographic combination as defined in claim 55, wherein the shutter cam surface resets the shutter mechanism once per revolution of the thumbwheel and the film metering cam surface releases the film metering mechanism once per revolution of the thumbwheel.

60. A photographic combination as defined in claim 59, further including a toothed sprocket that engages the photographic film such that one revolution of the thumbwheel rotates the toothed sprocket one revolution and moves the photographic film a distance of one frame.

61. A photographic combination as defined in claim 59, wherein the shutter cam surface resets the shutter mechanism after a one-half rotation of the thumbwheel and the film metering cam surface releases the film metering mechanism after a one-half rotation of the thumbwheel.

62. A photographic combination as defined in claim 61, further including a toothed sprocket that engages the photographic film such that a one-half rotation of the thumbwheel produces a one-half rotation of the toothed sprocket and moves the photographic film a distance of one-half frame.

63. A photographic combination as defined in claim 61, further including a toothed sprocket that engages the photographic film such that a one-half rotation of the thumbwheel produces a one-half rotation of the toothed sprocket and moves the photographic film a distance of one full frame.

64. A photographic camera film drive gear comprising:
a thumbwheel having an outer circumferential surface of which a portion projects externally out of the photographic camera that moves photographic film retained in the photographic camera when the thumbwheel is rotated by a camera user;
a shutter cam surface that rotates with the thumbwheel so that a shutter reset lever of the photographic camera is moved by the shutter cam surface to reset a shutter mechanism after a predetermined rotation of the thumbwheel; and
a film metering cam surface that rotates with the thumbwheel so that a metering lever of the photographic camera is moved by the film metering cam surface to release a film metering mechanism after a predetermined rotation of the thumbwheel, wherein the thumbwheel outer circumferential surface is coupled to a frame exposure counter wheel having frame index numbers such that one revolution of the thumbwheel moves the frame exposure counter wheel by one frame index number relative to the thumbwheel, the outer circumferential surface being toothed and in meshing engagement with the frame exposure counter wheel, which also is toothed.

65. A film drive gear as recited in claim 64, wherein the number of teeth on the thumbwheel outer circumferential surface is different from the number of teeth on the frame exposure counter wheel by one tooth.

66. A film drive gear for use in a photographic camera having a camera housing that receives a roll strip of film, an exposure gate in the camera housing that defines a shutter plane across which a length of film is extended, a shutter mechanism that is actuated after being placed in a set condition to momentarily open and thereby expose a frame of film at the exposure gate and includes a shutter reset lever that is moved to thereby place the shutter mechanism in the set condition so the shutter mechanism can be actuated, a shutter button that can be depressed to actuate the shutter mechanism, and a film metering mechanism that locks to prevent movement of the photographic film and includes a metering lever that is moved to thereby unlock the film metering mechanism and permit movement of the photographic film so that a fresh frame of the film can be positioned at the exposure gate, the film drive gear comprising:
a thumbwheel having an outer circumferential surface of which a portion projects externally out of the camera housing and moves the photographic film when the thumbwheel is rotated by the camera user;
a shutter cam surface that rotates with the thumbwheel so that the shutter reset lever is moved by the shutter cam surface to reset the shutter mechanism after a predetermined rotation of the thumbwheel; and
a film metering cam surface that rotates with the thumbwheel so that the metering lever is moved by the film metering cam surface and releases the film metering mechanism after a predetermined rotation of the thumbwheel, wherein the thumbwheel outer circumferential surface is coupled to a frame exposure counter wheel having frame index numbers such that one revolution of the thumbwheel moves the frame exposure counter wheel by one frame index number relative to the thumbwheel, wherein the thumbwheel outer circumferential surface and exposure counter wheel are toothed and in meshing engagement.

67. A film drive gear as recited in claim 66, including a toothed sprocket that directly engages the photographic film such that one revolution of the thumbwheel rotates the toothed sprocket one revolution and moves the photographic film by one frame.

68. A film drive gear as recited in claim 67, further including a film support surface that maintains engagement of the photographic film with the toothed sprocket when the thumbwheel direction of rotation is reversed.

69. A film drive gear as recited in claim 66, wherein the number of teeth on the thumbwheel outer circumferential surface is different from the number of teeth on the exposure counter wheel by one tooth.

70. A photographic camera comprising:
a camera housing that receives a roll strip of photographic film;
an exposure gate in the camera housing that defines a shutter plane across which a length of the photographic film is extended;
a shutter mechanism that is actuated after being placed in a set condition to momentarily open and thereby expose a frame of the photographic film at the exposure gate and includes a shutter reset lever that is moved to thereby place the shutter mechanism in the set condition so the shutter mechanism can be actuated;
a shutter release that is actuated by the camera user and in response actuates the shutter mechanism;
a film metering mechanism that locks and thereby prevents movement of the photographic film within the camera housing and includes a metering lever that moves to thereby unlock the film metering mechanism and permit movement of the photographic film so that a fresh frame of the photographic film can be positioned at the exposure gate;

a rotatable thumbwheel having an outer circumferential surface of which a portion extends externally out of the camera housing so that the camera user can rotate the thumbwheel, wherein the thumbwheel is coupled to the photographic film so that the thumbwheel moves the photographic film when the thumbwheel is rotated by the camera user;

a shutter cam surface that rotates with the thumbwheel so that the shutter reset lever of the shutter mechanism is moved by the shutter cam surface and resets the shutter mechanism after a predetermined rotation of the thumbwheel;

a film metering cam surface that rotates with the thumbwheel so that the metering lever of the film metering mechanism is moved by the film metering cam surface and releases the film metering mechanism after a predetermined rotation of the thumbwheel; and a frame exposure counter wheel having frame index numbers and gear teeth, wherein the thumbwheel outer circumferential surface is coupled to the frame exposure counter wheel gear teeth such that one revolution of the thumbwheel moves the frame exposure counter wheel by one frame index number relative to the thumbwheel, the thumbwheel outer circumferential surface and the frame exposure counter wheel being toothed, and in meshing engagement.

71. A photographic camera as recited in claim 70, wherein the number of teeth on the thumbwheel outer circumferential surface is different than the number of teeth on the frame exposure counter wheel by one tooth.

72. A film transport mechanism comprising:

a shutter mechanism that is actuated after being placed in a set condition to momentarily open and thereby expose a frame of photographic film at an exposure gate in a photographic camera and includes a shutter reset lever that is moved to thereby place the shutter mechanism in the set condition so the shutter mechanism can be actuated;

a film metering mechanism that locks to prevent movement of the photographic film and includes a metering lever that is moved to unlock the film metering mechanism and permit movement of the photographic film so that a fresh frame of the film can be positioned at the exposure gate, and a film drive gear comprising a thumbwheel with an outer circumferential surface of which a portion projects externally out of the photographic camera and is coupled to the photographic film such that the film drive gear moves the photographic film when the thumbwheel is rotated, the film drive gear further comprising a shaft that projects outwardly from the thumbwheel and includes a shutter cam surface that engages the shutter reset lever to thereby reset the shutter mechanism and a film metering cam surface that engages the metering lever to release the film metering mechanism upon rotation of the thumbwheel, wherein the thumbwheel outer circumferential surface is coupled to a frame exposure counter wheel having frame index numbers such that one revolution of the thumbwheel moves the frame exposure counter wheel by one frame index number relative to the thumbwheel, the thumbwheel outer circumferential surface and the frame exposure center wheel being toothed and in meshing engagement.

73. A film transport mechanism as recited in claim 72, including a toothed sprocket that directly engages the photographic film such that one revolution of the thumbwheel rotates the toothed sprocket one revolution and moves the photographic film by one frame, and a film support surface that maintains engagement of the photographic film with the toothed sprocket when the thumbwheel direction of rotation is reversed.

* * * * *